United States Patent [19]

Mueller

[11] Patent Number: 4,933,503

[45] Date of Patent: * Jun. 12, 1990

[54] NARROWING THE MOLECULAR WEIGHT DISTRIBUTION OF POLYTETRAHYDROFURAN AND OF COPOLYMERS OF TETRAHYDROFURAN AND ALKYLENE OXIDES

[75] Inventor: Herbert Mueller, Frankenthal, Fed. Rep. of Germany

[73] Assignee: BASF Aktiengesellschaft, Ludwigshafen, Fed. Rep. of Germany

[ * ] Notice: The portion of the term of this patent subsequent to Aug. 9, 2005 has been disclaimed.

[21] Appl. No.: 232,029

[22] Filed: Aug. 15, 1988

[30] Foreign Application Priority Data

Aug. 27, 1987 [DE] Fed. Rep. of Germany ....... 3728613

[51] Int. Cl.$^5$ .................... C07C 41/34; C07C 41/38
[52] U.S. Cl. .................................. 568/621; 568/617
[58] Field of Search ................................ 568/617, 621

[56] References Cited

U.S. PATENT DOCUMENTS

| | | | |
|---|---|---|---|
| 3,359,332 | 12/1967 | Johnston | 568/617 |
| 3,478,109 | 11/1969 | McConnell . | |
| 4,251,654 | 2/1981 | Robinson et al. . | |
| 4,478,109 | 10/1984 | Kobelt . | |
| 4,500,705 | 2/1985 | Chopelin . | |
| 4,510,333 | 4/1985 | Pruckmayr . | |
| 4,585,592 | 4/1986 | Mueller | 568/617 |
| 4,762,951 | 8/1988 | Mueller | 568/617 |

*Primary Examiner*—Howard T. Mars
*Attorney, Agent, or Firm*—John H. Shurtleff

[57] ABSTRACT

The molecular weight distribution of polytetrahydrofuran and of copolymers of tetrahydrofuran and alkylene oxides are narrowed by a process in which low molecular weight fractions are distilled off from the polymers under pressures of less than 0.3 mbar and at from 200° to 260° C., the distillation residue is mixed with a solvent mixture consisting of (a) an alkanol, (b) a hydrocarbon and (c) water, the content of the individual components a, b and c in the mixture being from 4 to 60% by weight, the phases formed are then separated from one another and the polymer having a narrower molecular weight distribution is isolated from the phase.

12 Claims, 1 Drawing Sheet

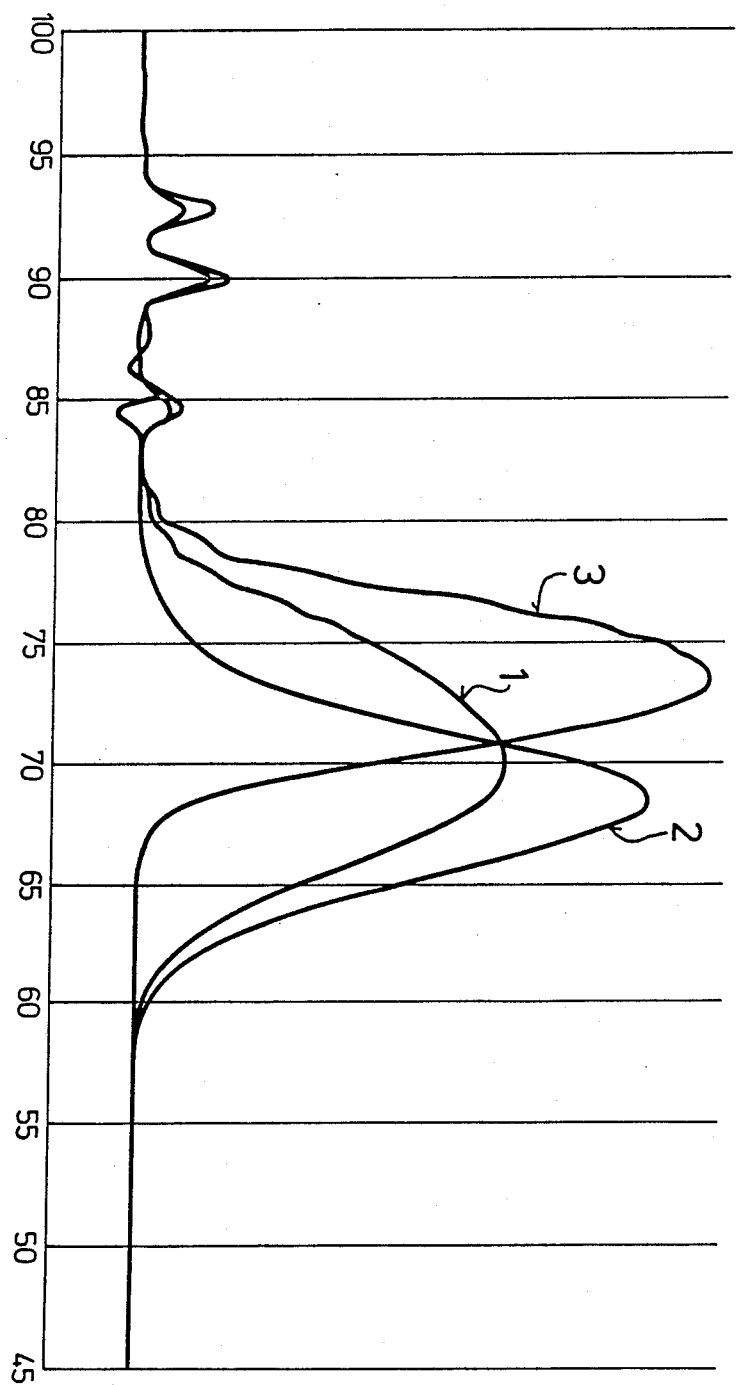

NARROWING THE MOLECULAR WEIGHT DISTRIBUTION OF POLYTETRAHYDROFURAN AND OF COPOLYMERS OF TETRAHYDROFURAN AND ALKYLENE OXIDES

The present invention relates to a process for narrowing the molecular weight distribution of polytetrahydrofuran and of copolymers of tetrahydrofuran and alkylene oxides by treating the polymer with a solvent mixture consisting of an alcohol, a hydrocarbon and water.

Polytetramethylene ether glycol, also called polytetrahydrofuran (PTHF), is an important intermediate. It is frequently used in the preparation of polyurethanes and polyesters, in order to provide them with soft segments. The polymerization of tetrahydrofuran (THF) to give PTHF is described in, for example, Angew. Chem. 72 (1960), 927. The relevant prior art includes the monograph entitled Polytetrahydrofuran by P. Dreyfuss, Gordon and Breach, Science Publishers, New York, London, Paris 1982.

PTHF is obtained by polymerization of THF using cationic catalysts. Like all polymeric compounds, it is composed of molecules having different degrees of polymerization. The molecular weight distribution may be more or less broad depending on the polymerization process chosen. Frequently, a Gaussian distribution is obtained. The molecular weight distribution of the PTHF is usually rather broad and frequently deviates from the Gaussian distribution in that the proportion of fractions having a higher molecular weight is smaller than the proportion of fractions having a low molecular weight, or vice versa. The uniformity of the molecular weight distribution is defined as the ratio of the weight average molecular weight ($M_w$) to the number average molecular weight ($M_n$). The number average molecular weight is obtained by dividing the weight of a sample by the number of molecules of which it is composed. The weight average molecular weight, on the other hand, is the sum of the products of fraction weights and molecular weights divided by the sum of the weights of the individual fractions. The molecular weight distribution is thus defined by the quotient $M_w/M_n$, which is also referred to as the heterogeneity factor. It is determined, for example, by molecular weight determinations by the light scattering method and osmometry or from the distribution curves obtained by means of gel permeation chromatography. The values $M_w$ and $M_n$ can be determined from these measured distribution curves. $M_n$ is furthermore obtained with greater accuracy by determining the terminal groups of PTHF. The heterogeneity factor corresponds roughly to the molecular weight distribution $M_{vis}/M_n$, as described in, for example, German Patent No. 2,453,114. $M_{vis}$ is referred to as the compression viscosity. It is an empirical value obtained from the relationship log $M_{vis}=0.493$ log viscosity (at 40° C. in Poise)$+3.0646$. This relationship is explained by the fact that the viscosity increases exponentially with the molecular weight in polymers having a broad molecular weight distribution. Thus, it is known that the viscosity of polymers having a broad molecular weight distribution is higher than those which have a narrow molecular weight distribution and the same structure and the same number average molecular weight. $M_{vis}/M_n$ is in general from 20 to 30% smaller than $M_w/M_n$. The molecular weight distribution of the PTHF has a considerable effect on the properties of the polyurethanes or polyesters prepared therefrom. Very generally, it is true that the mechanical properties of the finished products, in particular of structural materials, which are produced from PTHF are better the more monodisperse the PTHF used in terms of the molecular sizes. Conversely, it is true that end products having poorer properties are obtained if a PTHF having a broad molecular weight distribution is used.

Since a relatively broad molecular weight distribution is obtained in the preparation of PTHF polymers, there is a need either to develop a polymerization process which gives polymers in a narrow molecular weight distribution or to find a possibility of narrowing the molecular weight distribution of PTHF by an aftertreatment.

Canadian Patent No. 800,659 states that a PTHF having a relatively narrow molecular weight distribution is obtained if the polymerization of THF is terminated before equilibrium is reached. Such a process is difficult to reproduce since products having different mean molecular weights are formed depending on the time when the polymerization is terminated. Moreover, the narrowing of the molecular weight distribution achievable by this measure is small. The conversion of the monomer achieved is furthermore lower than in the equilibrium reaction, with the result that the process is more expensive.

German Patent No. 2,453,114 describes a process for the preparation of a PTHF having a narrow molecular weight distribution, in which a PTHF starting material is partially depolymerized to tetrahydrofuran at from 120° to 150° C. in the presence of a crosslinked ion exchanger resin in the acid form. Although this process gives satisfactory results, it has the disadvantage that cross-linked ion exchanger resins are expensive and have only limited stability to the substrate at elevated temperatures. The process can therefore only be carried out in a very narrow temperature range of from 120° to 135° C. There is always the risk that the PTHF used will be contaminated by dissolved ion exchanger resin components or the polymer will be discolored. Even at the low temperatures of from 120° to 135° C., it is impossible completely to avoid pronounced swelling of the ion exchanger resins and contamination of the PTHF by small amounts of the said resins. The temperature limit restricts the depolymerization rate and makes the process more expensive. Furthermore, the process degrades, in particular, only small molecules. The heavier molecules remain intact since they can reach the acidic centers of the catalyst only slowly, if at all. Hence, this process for narrowing the molecular weight distribution can only be used for polymers having mean molecular weights of from 600 to 2,000.

U.S. Pat. No. 3,478,109 describes a process in which PTHF having a mean molecular weight of from 1,500 to 12,000 is dissolved in a hydrocarbon and this solution is mixed with methanol or with a mixture of methanol and water. The methanolic phase, which contains the low molecular weight components, is separated off from the resulting two-phase system and is discarded. The PTHF purified in this manner is converted to polyurethanes by reaction with a diisocyanate.

Recently, U.S. Pat. No. 4,510,333 has disclosed a process for the preparation of PTHF having a narrow molecular weight distribution, in which, in a first stage, a mixture of THF and an ionic initiator is heated in order to produce a maximum number of oxonium ions, and then, in a second stage at a lower temperature, the actual polymerization is effected with further addition of THF. A process of this type requires complicated apparatus and is energy-consumptive and is therefore very expensive. The continuous polymerization by this two-stage procedure is furthermore difficult to realize from the point of view of process engineering. In the method described in Japanese Preliminary Published Application No. 85/42421, PTHF having a broad molecular weight distribution is treated with a mixture of water and a solvent having a poor dissolving power for PTHF, and the treatment mixture is separated into two fractions having a narrower molecular weight distribution. This process is unsuccessful in the case of a PTHF having a molecular weight greater than 2,500 or lower than 700 and particularly in the case of copolymers of THF and alkylene oxides. Furthermore, the oligomeric cyclic ethers present in the polymer accumulate in the fraction having the higher molecular weight.

It is an object of the present invention to provide a process which permits the preparation of two PTHF fractions having a narrow molecular weight distribution from a PTHF having a broad molecular weight distribution in short treatment times. Contamination of the product by catalyst components is unacceptable and there should be no limit with respect to the molecular size of the polymer to be treated. Easy polymerization of the tetrahydrofuran, in which temperature stages need not be maintained, would also be desirable. The process should also provide the possibility of obtaining from given polymers not only polymers whose mean molecular weights are higher than those of the starting materials but also polymers whose mean molecular weights are lower than those of the starting polymers. Finally, the novel process should also be applicable to polymers of THF having molecular weights greater than 2,500 or less than 700 and to copolymers of THF and alkylene oxides, and it should also be possible to separate off the oligomeric cyclic ethers always present in the polymers.

We have found that this object is achieved by a novel process for narrowing the molecular weight distribution of polytetrahydrofuran and of copolymers of tetrahydrofuran and alkylene oxides, wherein low molecular weight fractions are distilled off from the polymer under pressure of less than 0.3 mbar and at from 200° to 260° C., the distillation residue is mixed with a solvent mixture consisting of (a) an alkanol of 1 to 4 carbon atoms, (b) a hydrocarbon of 3 to 18 carbon atoms and (c) water, the content of the individual components a, b and c in the mixture being from 4 to 60% by weight, the phases formed are then separated from one another and the polymer having a narrower molecular weight distribution is isolated from the phases. Cyclic oligomeric ethers or esters of polytetramethylene ether glycol which were present in the polymer accumulate in the light hydrocarbon phase.

In the process of the invention, the starting material used is a PTHF obtainable by a conventional process. PTHF is obtained by polymerization of THF using cationic catalysts. This PTHF generally has a number average molecular weight of from 500 to 3,000, a heterogeneity factor of from 1.5 to 4 and a viscosity of from 1 to 70 Poise (at 40° C.). A PTHF having a mean molecular weight of from 500 to 2,000, preferably from 500 to 1,500, in particular from 500 to 1,300, is preferably used. Narrowing of the molecular weight distribution according to the invention is generally carried out in the case of these starting materials in such a way that two PTHF fractions having a molecular weight distribution ($M_w/M_n$) of from 1.2 to 2.4 are obtained for the above-mentioned molecular weight range. The smaller value is associated with the products having a low molecular weight, and the larger value with the products having a high molecular weight of up to, for example, 3,000.

In the novel process, it is also possible to treat copolymers obtainable by copolymerization of THF with alkylene oxides, the said copolymers thus being cleaved into polymers having a narrow molecular weight distribution. Particularly preferred copolymers of the stated type are those whose content of oligomeric cyclic ethers is less than 7% by weight. Such copolymers are obtained, for example, by processes such as those stated in U.S. Pat. No. 4,500,705. They contain, for example, from 60 to 80% by weight of THF and from 20 to 40% by weight of ethylene oxide or, for example, propylene oxide.

In the process of the invention, the polymers were first subjected to distillation under reduced pressure in order to separate off low molecular weight fractions. Distillation is carried out under pressures of <0.3, mbar and at from 200° to 260° C., in particular from 220° to 240° C., advantageously in a distillation apparatus for molecular distillation. By means of this distillation under reduced pressure, which may be supported by stripping with an inert gas or a low boiler, such as methanol, it is possible to free the polymers from polytetramethylene glycols having molecular weights of <400 and from oligomeric cyclic ethers having molecular weights of <450. In the PTHF obtained as a distillation residue, oligomeric cyclic ethers are no longer detectable by the conventional analytical methods. For example, oligomeric cyclic ethers cannot be extracted with a solvent, such as THF, from polyurethanes obtained by reacting in a conventional manner the PTHF, treated in this way, with diisocyanates. The PTHF obtained by the distillation under reduced pressure generally has a number average molecular weight of from 600 to 3,500, a heterogeneity factor of from 1.4 to 3.8 and a viscosity of from 1 to 80 Poise (at 40° C.).

The polymers freed from low molecular weight fractions in this manner are then treated with a solvent mixture consisting of (a) an alkanol of 1 to 4 carbon atoms, (b) a hydrocarbon of 3 to 18, preferably 4 to 12, carbon atoms and (c) water. The content of components a, b and c in the solvent mixture is from 4 to 60, preferably from 12 to 50, in particular from 15 to 40, % by weight. The solvent mixtures of the stated type are two-phase mixtures. If they are mixed with PTHF, a three-phase system is formed.

Ethanol or, preferably, methanol is advantageously used as the alkanols of 1 to 4 carbon atoms. Suitable hydrocarbons of 3 to 18, preferably 4 to 12, carbon atoms are aromatic, saturated or unsaturated aliphatic or cycloaliphatic hydrocarbons, which may also be used in the form of a mixture. Readily obtainable aliphatic or cycloaliphatic hydrocarbons are preferred. The cheap hydrocarbons, such as isobutene, n-heptane, n-octane, cyclopentane, cyclohexane, methylcyclohexane, cyclooctane, toluene, ethylbenzene or decalin, are advantageously used, of which straight-chain aliphatic hydrocarbons of 4 to 7 carbon atoms are preferred. The use of hydrocarbons of less than 5 carbon atoms is frequently advantageous even if it is necessary to employ very low temperatures or superatmospheric pressure. It is of course also possible to use any mixtures of hydrocarbons for carrying out the novel process. These may furthermore contain, as impurities, for example up to 10% by weight of hydrocarbons containing halogen, nitrogen or oxygen.

In the process, for example, the polymers are mixed thoroughly with the solvent mixture. For example, from 2 to 6 times the amount of solvent mixture, based on polymer, is used.

In an advantageous procedure, a solvent mixture which contains the components a, b and c in a weight ratio of about 1:1:1 is first used. Since the chosen mixing ratio in the solvent mixture influences both the degree of narrowing of the molecular weight distribution and the weight distribution of the two molecular weight fractions in the two lower phases, and furthermore the hydrocarbon and alcohol used affects the separation of the polymer employed, it is advisable to carry out a few experiments to determine the most advantageous solvent mixtures for the individual polymers, for example by doubling or halving the amount of alcohol and water in the solvent mixture until the desired distribution is obtained. Variation of the amount of hydrocarbon generally has less effect. This amount should be chosen so that it is about 5-100% by weight, based on the starting polymer to be treated. However, it is advantageous to choose it sufficiently high to ensure the formation of a third phase when the temperature is lowered by, for example, 10° C. The procedure in this limiting region may be appropriate if a simpler two-phase system is accepted at the expense of sharp molecular weight fractionation which gives products having lower heterogeneity factors. The use of systems which clearly consist of three phases is preferred.

For mixing, temperatures of from −10° to 80° C., preferably from 15° to 40° C., are chosen. It is advisable to employ temperatures at which the solvent mixture used has a comparatively low vapor pressure. Effects of the temperature on the distribution can in most cases be compensated by the choice of the mixing ratio of the three components of the solvent mixture. Good mixing of the phases, which is essential, can be effected by any conventional technique, such as stirring, shaking or by the use of a propulsive jet. The phases are separated, for example, simply by discharging and observing the phase boundaries or with the aid of centrifuges. The two or three phases obtained are freed from the adhering solvents by a conventional industrial method, for example by distillation under atmospheric or reduced pressure. The polymers having a narrower molecular weight distribution are obtained from the two lower phases. When PTHF or co-polymers are used, very high molecular weight PTHF, possibly also PTHF esters, are isolated from the upper-most phase, the higher molecular weight fraction of PTHF is isolated from the middle phase and the lower molecular weight fraction of PTHF is isolated from the lower phase. The solvent evaporated off can be condensed and then reused for the process.

The amount of very high molecular weight PTHF isolated from the uppermost phase is in general less than 4% by weight of the polymer used. The evaporation residue from the upper phase is not in general used again but can be reconverted to monomeric product, for example by depolymerization.

In the novel process, it is possible to degrade polymers of the stated type having a broad molecular weight distribution and average molecular size into two fractions, both of which have a very narrow distribution and whose mean molecular sizes are, for example, in a ratio of 1:2. Together, they account for more than 96% of the polymer used. The resulting narrowing of the molecular weight distribution and the separation of the original polymer into two fractions having substantially different molecular weights were unexpected and surprising. U.S. Pat. Nos. 4,500,705 and 4,251,654 describe the extractive treatment of copolymers of THF and ethylene oxide with hydrocarbons and water. In this treatment, the oligomeric cyclic ethers enter the hydrocarbon phase and the water without separation into molecular weight fractions occurring. In the process described in U.S. Pat. No. 3,478,109, in which two phases are formed, only one useful polymer fraction is obtained. In view of this, it could not be foreseen that it would be possible to achieve virtually quantitative separation into two molecular weight fractions in the novel procedure using a solvent comprising a combination of three components. There was the possibility that separation into molecular weight fractions would not occur or that the polymer would be distributed substantially uniformly over the three phases without the inventive discrete separation occurring.

In the Examples which follow, parts are by weight. Parts by weight bear the same relation to parts by volume as that of the kilogram to the liter.

EXAMPLE 1

PTHF prepared by polymerization of THF in the presence of acetic anhydride over a montmorillonite catalyst and having a mean molecular weight of 750, calculated from the hydroxyl number, is freed from volatile polytetramethylene ether glycols and cyclic oligomeric ethers in a molecular distillation apparatus with rotating wiper system KD 1800 from Leybold-Heraeus GmbH under a working pressure of 0.001 mbar and at an evaporator temperature of 230° C. The resulting polymer has a mean molecular weight of 1,000, derived from the hydroxyl number, and a heterogeneity factor $M_w/M_n$ of 1.7.

Some of this PTHF is then mixed thoroughly at 25° C. with one part of water, one part of cyclohexane and 5.25 parts of methanol. Three clear phases separate from this mixture in a short time. The weight ratio of the upper, middle and lower phases is about 1:2.5:6. By separately evaporating down the separated phases under atmospheric pressure and under reduced pressure at up to 150° C., the phases are separated into solvent and PTHF. A distillate which consists of a small amount of water and 99.5% by weight of cyclohexane and 0.5% by weight of methanol is obtained from the upper phase. About 1% by weight, based on the PTHF used, of evaporation residue remains. This PTHF has a mean molecular weight of 2,960, calculated from the hydroxyl number. A heterogeneous solvent mixture in which cyclohexane, water and methanol are present in a weight ratio of about 15.6:1:3.4 is obtained from the middle phase by evaporation. 40% by weight of the PTHF used are obtained as a residue. This PTHF has a molecular weight of 1,520, calculated from the hydroxyl number. The heterogeneity factor $M_w/M_{wn}$ is 1.4 and the viscosity at 40° C. is 3.2 Poise.

BRIEF DESCRIPTION OF THE DRAWING

The lower phase is also worked up in the manner described. The solvent mixture obtained is a mixture composed of about 60% by weight of methanol, 39.5% by weight of water and 0.5% by weight of cyclohexane. 36.9% by weight of PTHF used, having a mean molecular weight of 618, calculated from the hydroxyl number, and a heterogeneity factor $M_w/M_n$ of 1.3, are obtained as the evaporation residue. The viscosity at 40° C. is 1.2 Poise.

The attached drawing shows the molecular weight distribution in the crude chromatogram as obtained in gel permeation chromatography analysis. It shows the resulting molecular weight fractionation compared with the polymer used. In the graph, the relative frequency of the molecules is plotted against the molecular size. The curves show the molecular weight distribution $M_w/M_n$ (1) for the starting material with 1.7, (2) for the product of the middle phase with 1.4 and (3) for the product of the lower phase with 1.3.

Essentially the same result is obtained if a solvent mixture consisting of 1 part of n-heptane, 1 part of water and 5 parts of methanol is used for the molecular weight fractionation.

If a solvent mixture composed of 1 part of methylcyclohexane, 1 part of ethanol and 1.5 parts of water is used, 0.8% by weight of the PTHF used is found in the upper phase, 43.2% by weight in the middle phase and 56% by weight in the lower phase. The molecular weight of the PTHF of the middle phase is 1,630. It has a heterogeneity factor $M_w/M_n$ of 1.5.

The operating temperature in the extractions described is 25° C.

EXAMPLES 2 TO 7

A PTHF prepared by cationic polymerization of THF over a montmorillonite catalyst and in the presence of acetic anhydride and subsequent hydrolysis is subjected to the molecular distillation described in Example 1. The PTHF pretreated in this manner has a molecular weight of 980, determined from the terminal groups, and a heterogeneity factor of 1.8. This PTHF is treated with various solvent mixtures of n-heptane, methanol and water according to Example 1. The results obtained by working up the phases are summarized in the Table below. They show the dependence on the composition of the solvent mixture.

number of 20 mg KOH/g gives a molecular weight of 5,600 for the copolymer. The middle phase consists of 4% of water, 5% of methanol, 40% of n-heptane and 51% of a copolymer having a molecular weight of 3,000 and a heterogeneity factor of 2. The lower phase is composed of 27% of water, 23% of methanol, 0.5% of n-heptane and 49.5% of a copolymer having a molecular weight of 1,000 and a heterogeneity factor $M_w/M_n$ of 1.3. The amounts of polymer isolated from the middle and lower phases are roughly equal. A similar result is obtained if narrowing of the molecular weight is carried out at 25° C. under superatmospheric pressure using equal amounts of n-$C_4H_{10}$ instead of n-heptane.

I claim:
1. A process for narrowing the molecular weight distribution of a polymer selected from the group consisting of polytetrahydrofuran and a copolymer of tetrahydrofuran and an alkylene oxide, which process comprises:
   distilling off low molecular weight fractions from the polymer under pressures of less than 0.3 mbar and at from 200° to 260° C.;
   mixing the distillation residue with a solvent mixture consisting of
   (a) an alkanol of 1 to 4 carbon atoms,
   (b) a hydrocarbon of 3 to 18 carbon atoms, and
   (c) water,
   the content of individual components (a), (b) and (c) in the mixture being from 4 to 60% by weight;
   forming three phases of the solvent mixture containing the polymer and separating the three phases from each other; and
   isolating the polymer having a narrower molecular weight distribution from the two lower phases of the three phases formed in the phase separation.

2. A process as claimed in claim 1, wherein the solvent mixture contains methanol or ethanol as the alkanol.

3. A process as claimed in claim 1, wherein the solvent mixture contains an aliphatic hydrocarbon of 4 to 12 carbon atoms.

TABLE

| Example | Solvent mixture | | | | PTHF content and mol. weight (MM) in the phases | | | | | | $M_w/M_n$ of middle phase |
|---|---|---|---|---|---|---|---|---|---|---|---|
| | PTHF % by wt. | n-heptane % by wt. | $CH_3OH$ % by wt. | $H_2O$ % by wt. | Upper phase | | Middle phase | | Lower phase | | |
| | | | | | % by wt. | MM | % by wt. | MM | % by wt. | MM | |
| 2 | 20 | 20 | 40 | 20 | 3 | — | 40 | 1608 | 60 | 600 | 1.5 |
| 3 | 20 | 40 | 20 | 20 | 3.5 | — | 70 | 1260 | 30 | 410 | 1.4 |
| 4 | 25 | 25 | 25 | 25 | 2 | — | 71 | 1220 | 30 | 450 | 1.4 |
| 5 | 27 | 27 | 20 | 20 | 2 | — | 90 | 1050 | 10 | 430 | 1.2 |
| 6 | 28 | 28 | 17 | 17 | 2 | — | 98 | 1007 | 2 | 390 | 1.5 |
| 7 | 31 | 31 | 31 | 7 | 1.5 | — | 36 | 1400 | 64 | 770 | 1.3 |

EXAMPLE 8

A THF/ethylene oxide copolymer (26% by weight of ethylene oxide) is freed from cyclic oligomeric ethers and lower glycols by molecular distillation, as described in Example 1. The copolymer treated in this manner has a molecular weight of 1,000, calculated from the hydroxyl number of 56 mg KOH/g, and a heterogeneity factor $M_w/M_n$ of 1.8. 1.3 parts of the copolymer are mixed with a two-phase solvent mixture of 2.7 parts of n-heptane, 1 part of methanol and 1.3 parts of water at 25° C. Three phases form, the weight ratio of upper phase to middle phase to lower phase being 1.2:7.0:5.8. They are worked up as described in Example 1. The upper phase contains 0.3% of water, 2.7% of methanol, 96% of n-heptane and 1% of copolymer. The hydroxyl 4. A process as claimed in claim 1, wherein the solvent mixture contains a straight-chain aliphatic hydrocarbon of 4 to 7 carbon atoms.

5. A process as claimed in claim 1, wherein the polymer used is a polytetrahydrofuran having a mean molecular weight of from 500 to 3,000.

6. A process as claimed in claim 1, wherein the polymer used is a copolymer of tetrahydrofuran and an alkylene oxide selected from the group consisting of ethylene oxide and propylene oxide.

7. A process as claimed in claim 6, wherein said copolymer consists of from 60 to 80% by weight of the tetrahydrofuran and from 20 to 40% by weight of the alkylene oxide.

8. A process as claimed in claim 1, wherein the step of distilling off low molecular weight fractions from the polymer is carried out at a temperature of from 220° to 240° C.

9. A process as claimed in claim 8, wherein the polymer used is polytetrahydrofuran.

10. A process as claimed in claim 8, wherein the polymer used is a copolymer of tetrahydrofuran and an alkylene oxide selected from the group consisting of ethylene oxide and propylene oxide.

11. A process as claimed in claim 1, wherein the amount of hydrocarbon solvent (b) is chosen between about 5 and 100% by weight, based on the starting polymer to be treated, and sufficiently high to ensure the formation of a third phase.

12. A process as claimed in claim 8, wherein the amount of hydrocarbon solvent (b) is chosen between about 5 and 100% by weight, based on the starting polymer to be treated, and sufficiently high to ensure the formation of a third phase.

* * * * *